US010531355B2

(12) United States Patent
Xu et al.

(10) Patent No.: US 10,531,355 B2
(45) Date of Patent: Jan. 7, 2020

(54) MANAGEMENT APPARATUS, MEASUREMENT APPARATUS, MANAGEMENT METHOD, MEASUREMENT METHOD AND DIGITAL DEVICE WITH LAYER-3 FILTERING OF MEASUREMENT RESULTS

(71) Applicant: SONY CORPORATION, Tokyo (JP)

(72) Inventors: Xiaodong Xu, Beijing (CN); Xi Ke, Beijing (CN); Mingyang Li, Beijing (CN); Yang Liu, Beijing (CN); Yateng Hong, Beijing (CN); Ya Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/536,402

(22) PCT Filed: Dec. 22, 2015

(86) PCT No.: PCT/CN2015/098188
§ 371 (c)(1),
(2) Date: Dec. 13, 2017

(87) PCT Pub. No.: WO2016/101864
PCT Pub. Date: Jun. 30, 2016

(65) Prior Publication Data
US 2018/0109987 A1  Apr. 19, 2018

(30) Foreign Application Priority Data
Dec. 22, 2014  (CN) .......................... 2014 1 0808372

(51) Int. Cl.
H04W 36/00 (2009.01)
H04W 36/38 (2009.01)
(Continued)

(52) U.S. Cl.
CPC ......... *H04W 36/385* (2013.01); *H04W 16/14* (2013.01); *H04W 24/10* (2013.01);
(Continued)

(58) Field of Classification Search
CPC ... H04W 36/385; H04W 36/20; H04W 36/04; H04W 16/14; H04W 36/30; H04W 24/10;
(Continued)

(56) References Cited

U.S. PATENT DOCUMENTS

2010/0034096 A1* 2/2010 Yin ........................ H04B 1/707
370/241
2012/0113846 A1  5/2012 Narasimha et al.
(Continued)

FOREIGN PATENT DOCUMENTS

CN  102480756 A  5/2012
CN  103052087 A  4/2013
(Continued)

OTHER PUBLICATIONS

International Search Report dated Mar. 14, 2016 in PCT/CN2015/098188.
(Continued)

Primary Examiner — Khoi H Tran
Assistant Examiner — B M M Hannan
(74) Attorney, Agent, or Firm — Xsensus LLP

(57) ABSTRACT

A management apparatus, a measurement apparatus, a management method, a measurement method, and a digital device. The management apparatus at a user equipment side of a wireless communication system includes: a measurement unit, configured to perform wireless resource management measurement on reference signals of a target cell; an interference determination unit, configured to determine whether the interference of the measurement result meets a preset condition, and marking the measurement result with
(Continued)

the interference meeting the preset condition as a high interference measurement result; a filtering unit, configured to perform layer-3 filtering on the measurement result; and a mobility management unit, configured to perform mobility management on the user equipment according to the high interference measurement result. Reliable and accurate measurement of reference signals in a small cell scenario is realized.

6 Claims, 14 Drawing Sheets

(51) Int. Cl.
- H04W 24/10 (2009.01)
- H04W 36/30 (2009.01)
- H04W 16/14 (2009.01)
- H04W 36/20 (2009.01)
- H04W 36/04 (2009.01)
- H04W 84/04 (2009.01)

(52) U.S. Cl.
CPC ........... *H04W 36/04* (2013.01); *H04W 36/20* (2013.01); *H04W 36/30* (2013.01); *H04W 84/045* (2013.01)

(58) Field of Classification Search
CPC ............. H04W 84/045; Y02D 70/1262; Y02D 70/1264; Y02D 70/142; Y02D 70/166
USPC .................................................. 455/436, 439
See application file for complete search history.

(56) References Cited

U.S. PATENT DOCUMENTS

| | | | | |
|---|---|---|---|---|
| 2012/0115463 A1* | 5/2012 | Weng | .................... | H04L 1/0026 455/425 |
| 2012/0115485 A1 | 5/2012 | Narasimha et al. | | |
| 2012/0207044 A1 | 8/2012 | Johansson et al. | | |
| 2014/0105042 A1* | 4/2014 | Cui | ........................ | H04W 24/00 370/252 |
| 2014/0241194 A1 | 8/2014 | Zhou et al. | | |
| 2014/0301301 A1* | 10/2014 | Cheng | ................... | H04L 5/0048 370/329 |
| 2014/0334320 A1 | 11/2014 | Liu et al. | | |
| 2015/0118968 A1* | 4/2015 | Nory | ............... | H04W 36/00837 455/67.11 |
| 2015/0358827 A1* | 12/2015 | Bendlin | ............ | H04W 72/0413 455/454 |
| 2016/0066255 A1* | 3/2016 | Marinier | ............... | H04W 48/16 370/350 |
| 2016/0198373 A1* | 7/2016 | Thangarasa | ....... | H04W 36/0088 455/436 |
| 2016/0242055 A1* | 8/2016 | Kim | ......................... | H04L 5/00 |
| 2017/0064571 A1* | 3/2017 | Kusashima | ........... | H04W 24/10 |
| 2017/0064576 A1* | 3/2017 | Kusashima | ........... | H04W 48/16 |
| 2017/0078903 A1* | 3/2017 | Kusashima | ........... | H04W 24/10 |

FOREIGN PATENT DOCUMENTS

| | | | | |
|---|---|---|---|---|
| CN | 103096369 A | 5/2013 | | |
| CN | 103222307 A | 7/2013 | | |
| EP | 2765796 A1 | 8/2014 | | |
| WO | 2014/116049 A1 | 7/2014 | | |
| WO | WO2014165712 | * 10/2014 | ............ | H04W 48/16 |
| WO | WO2015064974 | * 7/2015 | ............ | H04W 24/08 |

OTHER PUBLICATIONS

Extended Search Report issued in European Application 15871932.8 dated Jul. 24, 2018.

3GPP TSG RAN WG 1 Meeting #72bis, "Discussion on Small-Cell Discovery", ETRI, 3 Pages total, (Apr. 15-19, 2013).

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 11)", 3rd Generation Partnership Project (3GPP), 356 Pages total, (Dec. 2014).

* cited by examiner

MANAGEMENT APPARATUS,
MEASUREMENT APPARATUS,
MANAGEMENT METHOD, MEASUREMENT
METHOD AND DIGITAL DEVICE WITH
LAYER-3 FILTERING OF MEASUREMENT
RESULTS

FIELD

The present disclosure relates to the field of wireless communication technology, and particularly relates to a management device, a measurement device, a management method, a measurement method and an electronic apparatus for performing radio resource management measurement on a reference signal in a small cell scene.

BACKGROUND

A small cell network (SCN) is considered as an effective means to deal with rapid increasing of data traffic. Due to dense deployment of small cells, synchronization signals and reference signals will be interfered severely among cells. Therefore, it needs to solve the problem of performing radio resource management (RRM) measurement on the reference signal in the small cell scene. In addition, in order to deal with blowout growth of the data traffic in the future, an operator may deploy more small cells so as to utilize all available spectrum resources as much as possible. Some unlicensed frequency bands for example a 5 GHz frequency band have rich spectrum resources, and effective utilizing of these frequency bands may assist the operator to provide faster and better services. However, introducing of a long term evolution-unlicensed (LTE-U) frequency band or a Licensed-Assisted Access (LAA) frequency band further increases the interference among the small cells, thereby further intensifying the problem of RRM measurement for the reference signal.

On the other hand, presently RAN 1 is discussing an ON/OFF mechanism of the small cell. In addition, the RAN 1 designs a new reference signal, i.e., a discovery reference signal (DRS), to support an ON/OFF process of the small cell. The DRS-based measurement facilitates the subsequent ON/OFF of the cell and user switch. Due to new characteristics of the DRS, the RRM measurement based on the DRS is necessarily different from the RRM measurement based on other reference signals. Therefore, the RRM measurement based on the DRS needs to be corrected and improved accordingly.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above issue, an object of the present disclosure is to provide a management device, a measurement device, a management method, a measurement method and an electronic apparatus, which can perform RRM measurement on a reference signal in a small cell scene, so as to perform mobility management on user equipment.

According to an aspect of the present disclosure, a management device on a user equipment side in a wireless communication system is provided, which includes: a measuring unit configured to perform radio resource management measurement on a reference signal of a target cell; an interference judging unit configured to judge whether interference in a measurement result satisfies a predetermined condition and label a measurement result the interference of which satisfies the predetermined condition as a measurement result with high interference; a filtering unit configured to perform Layer-3 filtering on the measurement result; and a mobility managing unit configured to perform mobility management on the user equipment based on the measurement result with high interference.

According to another aspect of the present disclosure, a measurement device on a user equipment side in a wireless communication system is provided, which includes: a primary cell discovering unit configured to discover a primary cell in a macro cell and obtain a sending time instant at which the primary cell sends a reference signal, the primary cell being a small cell keeping connection with the user equipment all the time; an interacting unit configured to interact with a macro base station corresponding to the macro cell or a base station corresponding to the primary cell so as to obtain a reference signal measurement timing configuration in the macro cell, wherein the reference signal measurement timing configuration comprises measuring cycles for reference signals of all small cells in the macro cell and offsets between sending time instants at which other small cells send the reference signals and the sending time instant at which the primary cell sends the reference signal; a sending time instant determining unit configured to determine the sending time instants at which other small cells send the reference signals based on the sending time instant at which the primary cell sends the reference signal and the offsets; and a measuring unit configured to measure, for each small cell, the reference signal of the small cell in such a manner that a measuring time instant at which the reference signal of the small cell is measured is aligned with the sending time instant at which the small cell sends the reference signal.

According to another aspect of the present disclosure, a management method on a user equipment side in a wireless communication system is further provided, which includes: a measuring step of performing radio resource management measurement on a reference signal of a target cell; an interference judging step of judging whether interference in a measurement result satisfies a predetermined condition and labeling a measurement result the interference of which satisfies the predetermined condition as a measurement result with high interference; a filtering step of performing Layer-3 filtering on the measurement result; and a mobility managing step of performing mobility management on the user equipment based on the measurement result with high reference.

According to another aspect of the present disclosure, a measurement method on a user equipment side in a wireless communication system is further provided, which includes: a primary cell discovering step of discovering a primary cell in a macro cell and obtaining a sending time instant at which the primary cell sends a reference signal, the primary cell being a small cell keeping connection with the user equipment all the time; an interacting step of interacting with a macro base station corresponding to the macro cell or a base station corresponding to the primary cell so as to obtain a reference signal measurement timing configuration in the macro cell, wherein the reference signal measurement timing configuration comprises measuring cycles for reference signals of all small cells in the macro cell and offsets between sending time instants at which other small cells send the reference signals and the sending time instant at which the primary cell sends the reference signal; a sending time instant determining step of determining the sending time instants at which other small cells send the reference signals based on the sending time instant at which the primary cell sends the reference signal and the offsets; and a measuring step of measuring, for each small cell, the reference signal of the small cell in such a manner that a measuring time instant at which the reference signal of the small cell is measured is aligned with the sending time instant at which the small cell sends the reference signal.

According to another aspect of the present disclosure, an electronic apparatus is further provided, which includes one or more processors configured to perform the management method and/or the measurement method according to the present disclosure described above.

According to other aspects of the present disclosure, it is further provided computer program codes and a computer program product for implementing the management method and/or the measurement method according to the present disclosure described above and a computer readable storage medium on which computer program codes for implementing the management method and/or measurement method according to the present disclosure described above are recorded.

According to the embodiments of the present disclosure, for the problems such as high interference in the small cell scene, characteristics of the reference signal itself and the like, reliable and accurate radio resource management measurement for the reference signal are realized, and it also enables the user equipment to perform the RRM measurement with low power consumption.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1:
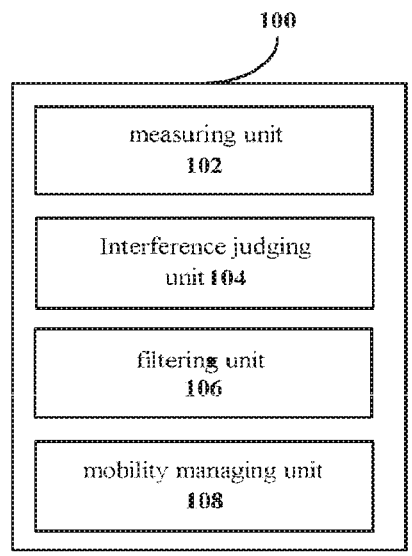
FIG. 1 is a block diagram illustrating a function configuration example of a management device on a user equipment side in a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Hereinafter, preferred embodiments of the present disclosure are described in detail with reference to FIG. 1 to FIG. 18.

Firstly, a function configuration example of a management device on a user equipment side in a wireless communication system according to an embodiment of the present disclosure is described with reference to FIG. 1. FIG. 1 is a block diagram illustrating a function configuration example of a management device on a user equipment side in a wireless communication system according to an embodiment of the present disclosure.

As shown in FIG. 1, a management device 100 according to the embodiment includes a measuring unit 102, an interference judging unit 104, a filtering unit 106 and a mobility managing unit 108. Subsequently, function configuration examples of respective units are described in detail.

The measuring unit 102 is configured to perform radio resource management measurement on a reference signal of a target cell. Preferably, the target cell is a small cell supporting operating in a long term evolution-unlicensed frequency band. For example, the small cell operates in a 5 GHz frequency band (a Wi-Fi frequency band) using the Licensed-Assisted Access (LAA) technology.

Preferably, the reference signal here is a signal including a pilot sequence, and may include for example at least one of a discovery reference signal (DRS), a cell specific reference signal (CRS) and a channel state indicator-reference signal (CSI-RS). However, it should be noted that although only examples of some existing reference signals are listed here, the embodiment of the present disclosure may be also applicable to a new reference signal which will be proposed in the future with the development of the wireless communication technology.

The discovery reference signal (DRS) is a new reference signal proposed by RAN 1 for the small cell scene. The DRS is proposed to assist load balancing, interference coordination, RRM measurement and cell identification among dense small cells. The DRS may include CRS and synchronization signals (a primary synchronization signal (PSS) and a secondary synchronization signal (SSS)), and may further include CSI-RS in some cases. As compared with the conventional reference signal such as CRS and CSI-RS, the DRS has new features. Therefore, it needs to modify the conventional measurement manner to realize the RRM measurement for the reference signal in the small cell scene.

It should be noted that, in the following description of the embodiments of the present disclosure, description will be made by taking the DRS as an example of the reference signal. However, the present disclosure is not limited thereto, and the present disclosure may be also similarly applied to the existing other reference signals and a new reference signal which may appear in the future.

Specifically, the measuring unit 102 may be further configured to measure the reference signal by aligning a measuring time instant at which the reference signal is measured with a sending time instant at which the target cell sends the reference signal. In addition, preferably, the measuring unit 102 may measure the reference signal in a relaxed measurement manner.

The conventional reference signal such as the CRS appears in each sub-frame, and is an "always-on" signal. By comparison, a cycle of the DRS is much longer (which may be 40/80/160 ms). Meanwhile, due to the interference coordination, there may be offsets between the DRSs of different small cells.

Figure 2:
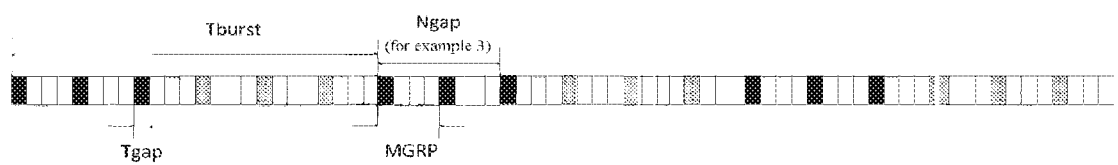
FIG. 2 is a schematic diagram describing a relaxed measurement manner.

In addition, in order to achieve load transfer among the small cells, if inter-frequency deployed small cells are identified according to a cycle (40 ms or 80 ms) of measurement gaps of the DRS, power of a battery of the UE will be consumed greatly. Therefore, in order to ensure an identification result for the small cell while reducing electric power consumption of the UE as much as possible, multiple small cell discovery schemes have been proposed in an RAN 2 HetNet mobility, one of which is relaxed measurement. The scheme of the relaxed measurement defines a longer measurement cycle to discover an inter-frequency cell. The relaxed measurement may be performed based on a burst gap, and a principle of the relaxed measurement is shown in FIG. 2. FIG. 2 is a schematic diagram describing a principle of the relaxed measurement manner.

As shown in FIG. 2, the burst gap appears every other $T_{burst}$. There are $N_{gap}$ measurement gaps in one burst event. A duration of each measurement gap is $T_{gap}$, and an interval between the measurement gaps is MGRP.

As can be seen, in the measurement scheme, some gaps for scanning are omitted (for example gray gaps shown in FIG. 2), such that the electric power consumption of the user equipment is minimized. However, in the relaxed measurement manner, only a small part of time is used to search inter-frequency cells in such a long measurement cycle, thus the inventor considers that the measurement time instant is likely to be unmatched with a sending time instant of the DRS, resulting in that the RRM measurement on the DRS can not be performed efficiently.

It should be noted that, in the relaxed measurement manner, a base station still performs a measurement configuration for the user equipment in the conventional manner, for example including dense measurement gaps, but the user equipment may perform continuous but less frequent inter-frequency small cell measurement based on a subset of the measurement gaps configured by the base station, so as to detect small cells.

In view of the above condition, for the characteristics of the relaxed measurement manner, the present disclosure designs a manner of performing RRM measurement on the DRS to efficiently realize the relaxed measurement, in which the measuring unit 102 may measure the reference signal by aligning a duration ($T_{gap}$) of each of the measuring gaps in the burst gap ($T_{burst}$) of the relaxed measurement manner with the sending time instant at which the target cell sends the reference signal, configuring the interval (MGRP) among the measuring gaps of the relaxed measurement manner as integral multiples of the measuring cycle (40/80/160 ms) for the reference signal, and configuring the burst gap of the relaxed measurement manner as integral multiples of the interval among the measuring gaps.

According to the above description, the measuring unit 102 measures the reference signal in the relaxed measurement manner by aligning the measuring time instant with the sending time instant for the reference signal, thereby reducing energy consumption of the user equipment and obtaining a relatively accurate and reliable measurement result.

Returning to and referring to FIG. 1, the interference judging unit 104 may be configured to judge whether interference in the measurement result of the measuring unit 102 satisfies a predetermined condition, and label a measurement result the interference of which satisfies the predetermined condition as a measurement result with high interference.

In the small cell scene, great interference is generated due to dense deployment of the small cells and frequent ON/OFF operations of the small cells. In addition, for scarcity of the spectrum resources, a long term evolution-unlicensed (LTE-U) frequency band is introduced to relieve the situation of scarcity of the spectrum resources. Therefore, the measurement unit 102 may preferably measure the reference signal in the long term evolution-unlicensed frequency band. However, in the LTE-U scene, the small cell operates in the unlicensed frequency band, thus the small cell is susceptible to interference from other apparatuses, thereby resulting in further pollution for the DRS and making the user equipment can not obtain an accurate measurement result.

With respect to this case, it needs to consider the interference in the RRM measurement result in the small cell scene. For a measurement result with short-time high interference, strength of a reference signal thereof changes little, and variation in strength of an interference signal dominates. Therefore, a variable may be maintained to record a current average interference signal strength. If in a current measurement result, the strength of the interference signal is obviously higher than the original average interference signal strength, it may be considered that the current measurement result is the measurement result with high interference.

According to the stipulation for a reference signal reception quality (RSRQ) based on DRS in the 3GPP RAN 2, there is an equation: RSRQ=(N*RSRP)/DRSSI. The DRSSI is measured on OFDM symbols of a downlink part of all measurement sub-frames and indicates a reception signal strength indication measured based on the DRS; the RSRP is measured on OFDM symbols of sub-frames in which the DRS signal appears and indicates a reference signal reception power measured based on the DRS; and N indicates the number of resource blocks of a measurement bandwidth of the DRSSI. Therefore, an interference part (including interference from other signals and noise) of the DRS measurement result corresponds to Pi=(DRSSI−N*RSRP), and a magnitude of the interference can be known according to a value of Pi. For example, in a case that the calculated value of the interference part is greater than a predetermined interference threshold, the measurement result can be determined as a measurement result with high interference.

It should be noted that, the method for calculating the interference part described here is only exemplary, and those skilled in the art can obtain the interference part in the measurement result in other ways, which will not be limited in the present disclosure.

The filtering unit 106 may be configured to perform for example a Layer-3 (L3) filtering in the 3GPP LTE-A standard on the measurement result. In an example of the present disclosure, the measuring unit 102 of the user equipment firstly performs intra-frequency/inter-frequency measurement on Layer 1 (L1) in a fixed measurement cycle, then the L1 reports a measurement result to the L3 at a certain interval, and then the L3 filters the current measurement result and measurement results stored previously.

It should be understood that, different channel environments, rates and measurement bandwidths all influence the measurement results of the reference signal reception power (RSRP) and the RSRQ. In order to ensure accuracy of the decision of the mobility management, the L3 filtering may be performed to generate a stable measurement result.

The mobility managing unit 108 may be configured to perform mobility management on the user equipment based on the measurement result with high interference.

Figure 3:
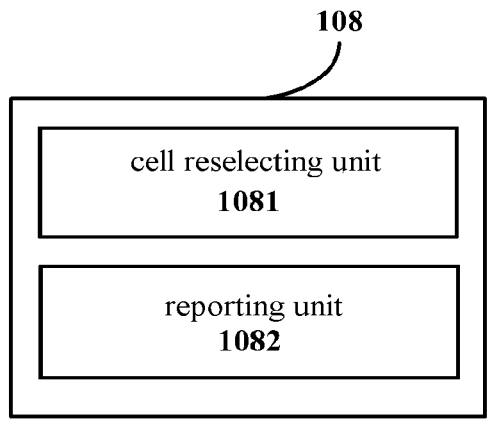
FIG. 3 is a block diagram illustrating a function configuration example of a mobility management unit in the management device according to an embodiment of the present disclosure.

FIG. 3 shows a function configuration example of a mobility managing unit in the management device according to an embodiment of the present disclosure.

As shown in FIG. 3, a mobility managing unit 108 may include at least one of a cell reselecting unit 1081 and a reporting unit 1082. The cell reselecting unit 1081 may be configured for cell reselection in a case that the user equipment is in an idle state, and the reporting unit 1082 may be configured for reporting a measurement result in a case that the user equipment is in a connected state.

It should be understood that, in the mobility management, actions related to the measurement includes adding/deleting, activating/deactivating of component carriers and cell handover in a case that the user equipment is in the connected state (RRC_connected), and the cell reselection in a case that the user equipment is in the idle state (RRC_idle). In a case of performing the cell handover, the user equipment needs to report the measurement result to a base station, so that the base station instructs the user equipment to perform handover to a corresponding cell based on the measurement result. In a case of performing the cell reselection, the user equipment does not need to report the measurement result to the base station, but selects a corresponding cell according to the measurement result. It should be noted that, one component carrier generally corresponds to one cell, for example a cell performing carrier aggregation with other component carriers. Specifically, the cell may be a macro cell or a small cell. Therefore, in some cases, when a certain component carrier is referred, it may be understood as a certain cell corresponding to the certain component carrier.

Hereinafter the case of performing the cell handover will be described firstly.

Figure 4:
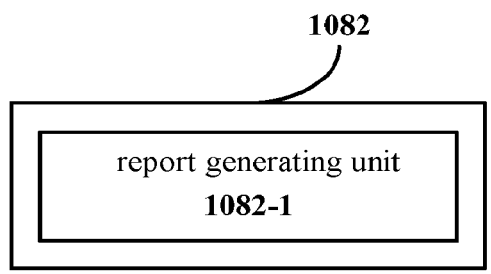
FIG. 4 is a block diagram illustrating a function configuration example of a reporting unit in the management device according to an embodiment of the present disclosure.

FIG. 4 is a block diagram illustrating a function configuration example of a reporting unit in the management device according to an embodiment of the present disclosure.

As shown in FIG. 4, a reporting unit 1082 may include a measurement report generating unit 1082-1. The measurement report generating unit 1082-1 may be configured to generate a measurement report to contain statistical information on the measurement result with high interference.

Specifically, the statistical information on the measurement result with high interference may include but not limited to at least one of: a total number of the measurement results with high interference appearing in a predetermined time period, a number of the measurement results with high interference appearing continuously, and statistical results related to the values of the measuring results with high interference (for example an average value of the measurement results with high interference, an offset of the average value relative to a reference value, and the like).

In this case, the user equipment reports the measurement result to the base station in any case and also reports the statistical information on the measurement result with high interference to the base station, such that the base station determines, according to the received measurement report, a radio resource management scheme, for example mobility management such as adding, deleting, activating and deactivating of component carriers and cell handover, or a resource scheduling scheme such as power control, channel allocation and load control.

Alternatively, it may be evaluated by the user equipment whether to report a measurement result of a related cell to the base station according to the measurement result. Subsequently, the case is described in detail with reference to FIG. 5.

Figure 5:
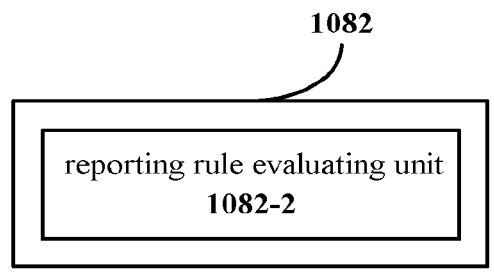
FIG. 5 is a block diagram illustrating another function configuration example of the reporting unit in the management device according to an embodiment of the present disclosure.

FIG. 5 is a block diagram illustrating another function configuration example of the reporting unit in the management device according to an embodiment of the present disclosure.

As shown in FIG. 5, the reporting unit 1082 may include a reporting rule evaluating unit 1082-2, which may be configured to evaluate, based on the measurement result with high interference, whether to report a filtered measurement result of the target cell and/or whether to report the statistical information on the measurement result with high interference.

Specifically, in an example, in performing a measurement configuration for the user equipment, the base station may contain in configuration signaling information related to a rule for reporting the measurement result. For example, for a certain cell (for example a neighbor cell), if the information related to the measurement result with high interference satisfies a predetermined condition (for example the measurement result with high interference being greater than a predetermined threshold, a predetermined number of measurement results with high interference appearing continuously, the number of the measurement results with high reference appearing within a predetermined time period being greater than a predetermined threshold, or the like), the user equipment may not report the measurement report related to the cell, or may contain the statistical information on the measurement result with high interference in the measurement report. Therefore, the reporting rule evaluating unit 1082-2 may evaluate, based on the measurement configuration from a base station and the received measurement result with high interference, whether to conform to the reporting rule, i.e., whether to report the measurement result of the target cell or whether to report the statistical information on the measurement result with high interference. Accordingly, the measurement configuration information generated by the base station may include the reporting rule for the measurement result with high interference, so that the user equipment may evaluate whether to report corresponding information. In this case, the reporting unit 1082 may selectively contain the filtered measurement result of the target cell and the statistical information on the measurement result with high interference in the measurement report to be reported the base station, according to the evaluation result of the reporting rule evaluating unit 1082-2. As can be seen, by means of the processing of the reporting rule evaluating unit 1082-2, the user equipment may autonomously determine whether to report the measurement reports of certain cells. For example, for a target cell the measurement result with high interference of which satisfies the predetermined condition (for example a cell which is not suitable to serve as a handover target), measurement result thereof may be not reported, thereby reducing signaling interaction between the user equipment and the base station, saving resources and improving efficiency.

In another example, the user equipment performs carrier aggregation communication with the base station. Specifically, the user equipment communicates with the base station over a primary component carrier PCC (corresponding to a primary cell Pcell) on a licensed frequency band and a secondary component carrier SCC (corresponding to a secondary cell Scell) on an unlicensed frequency band. The user equipment performs RRM measurement on the SCC, so as to determine a resource management strategy, for example, whether to deactivate the SCC or replace the SCC with another component carrier. In the conventional technology, in a case that the RRM measurement result of the SCC after being subject to Layer-3 filtering from the user equipment, for example the RSRP, is less than a predetermined threshold or less than the RSRP of other candidate component carrier, the SCC triggers a corresponding report event, such that the base station determines to deactivate the SCC or replace the SCC with another component carrier based on the measurement report. As described above, the reference signal carried by the SCC on the unlicensed frequency band may temporarily suffer high interference from a wifi signal for example, but the component carrier on the unlicensed frequency band only functions as SCC in the example, and thus short-time high interference on the SCC will not substantively influence communication of the user equipment. However, according to the L3 filtering and the measurement reporting manner in the conventional technology, due to a delay effect of a filter, the short-time high interference will influence the filtered result for a long time period. For example, the L3 filtering unit continuously outputs a lower measurement result and thus may trigger a predetermined report event, such as an event A2 (quality of a serving cell is lower than a threshold)/A6 (quality of an intra-frequency adjacent cell is higher than quality of a secondary cell) in the LTE-A, thereby wasting signaling resources and even resulting in that the base station improperly or frequently deactivates/replaces the corresponding SCC.

In the technical solution of the present disclosure, the reporting rule evaluating unit 1082-2 may be configured to evaluate, according to the measurement result with high interference, whether to report a filtered measurement result of the target SCC and/or whether to report the statistical information on the measurement result with high interference of the target SCC so as to be judged by the base station. For example, even if the L3 filtering output conforms to the conventional event reporting condition, the reporting rule evaluating unit 1082-2 still needs to evaluate whether the measurement result with high interference on the target SCC (for example the measurement result with high interference included in measurement results input to the L3 filtering) is short-time high interference or continuous high interference for example, thereby further determining whether to report the measurement result. Specifically, the reporting rule evaluating unit 1082-2 stops reporting a corresponding event in a case of determining that the interference on the target SCC is short-time high interference according to the statistical information on the measurement result with high interference; and reports a corresponding measurement result in a case of determining that the interference on the target SCC is continuous high interference. According to the above solution, availability of the unlicensed frequency band can be improved and signaling overhead can be reduced.

In addition, in a preferred example, before subjecting the measurement result to the L3 filtering, the measurement result with high interference among the measurement results may be corrected, so as to eliminate influence of the interference on the mobility management Hereinafter the preferred example is described in detail in conjunction with FIG. 6.

Figure 6:
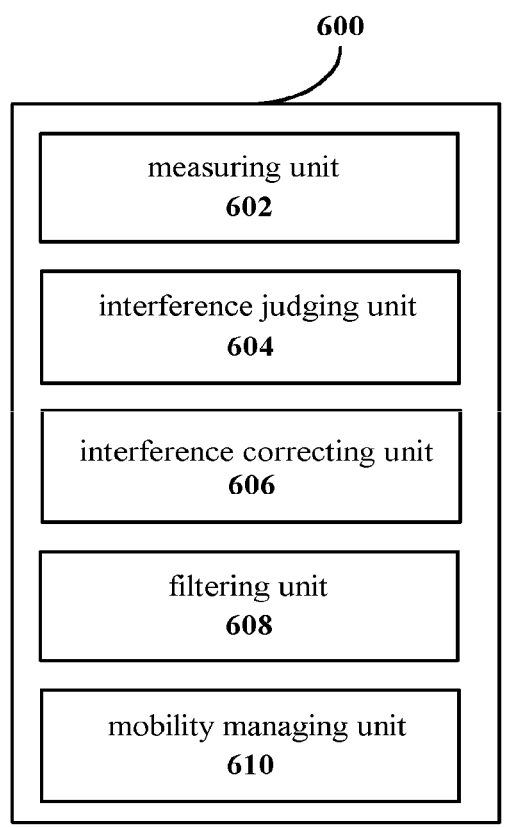
FIG. 6 is a block diagram illustrating another function example of the management device on the user equipment side in a wireless communication system according to an embodiment of the present disclosure.

FIG. 6 is a block diagram illustrating another function configuration example of the management device on the user equipment device side in a wireless communication system according to an embodiment of the present disclosure.

As shown in FIG. 6, a management device 600 according to the embodiment may include a measuring unit 602, an interference judging unit 604, an interference correcting unit 606, a filtering unit 608 and a mobility managing unit 610.

Function configuration examples of the measuring unit 602, the interference judging unit 604, the filtering unit 608 and the mobility managing unit 610 are the same as the function configuration examples of the measuring unit 102, the interference judging unit 104, the filtering unit 106 and the mobility managing unit 108 described above, which are not repeated here. Hereinafter only a function configuration example of the interference correcting unit 606 is described in detail.

The interference correcting unit 606 may be configured to correct the measurement result with high interference so as to eliminate influence on the mobility management from the interference included in the measurement result, and output the corrected measurement result to the filtering unit 608.

Preferably, the interference correcting unit 606 may be configured to respectively correct each measurement result with high interference or collectively correct all measurement results with high interference among a predetermined number of measurement results.

Specifically, respectively correcting each measurement result with high interference includes at least one of the following ways: ignoring the measurement result with high interference, thereby not inputting the measurement result with high interference to the filtering unit 608; taking a preceding measurement result without high interference as a current measurement result and inputting it to the filtering unit 608; and subtracting from the measurement result with high interference an increased interference value of the measurement result with high interference relative to a predetermined interference threshold and inputting it to the filtering unit 608.

In a case that all measurement results with high interference among the predetermined number of measurement results are collectively corrected, each of all the measurement results with high interference may be corrected in one of the above-described ways.

In addition, optionally, if the measurement result with high interference of the target cell satisfies the predetermined condition, for example, if a predetermined number of measurement results with high interference appear continuously, or a predetermined number of measurement results with high interference or more appear within a predefined time window, the user equipment may not correct the measurement results with high interference, but reports the interference condition to the base station to make a decision by the base station.

As an example, labeling and reporting of continuous measurement results with high interference depend on a correcting method for the measurement result with high interference. Specifically, in a case of respectively correcting each measurement result with high interference, the user equipment needs to label each measurement result with high interference. If a predetermined number of measurement results with high interference for example appear continuously or if a predetermined number of measurement results with high interference or more appear within a certain predefined time window, a continuous high interference event will be triggered, and the user equipment reports the event to the base station. On the other hand, in a case that interference correction is performed collectively before the measurement results are inputted into the L3 filter (i.e., all measurement results with high interference among a predetermined number of measurement results are corrected collectively), the user equipment needs to maintain a predefined time window (corresponding to the predetermined number of measurement results described above), and if the predetermined number of measurement results with high interference or more appear within the time window, the continuous high interference event will be triggered, and the user equipment reports the event to the base station.

Alternatively, in order to solve the interference problem regarding performing measurement on the LTE-U frequency band in the small cell scene, influence of the interference may be also reduced by enhancing the L3 filter. This case is described in detail with reference to FIG. 7 hereinafter.

Figure 7:
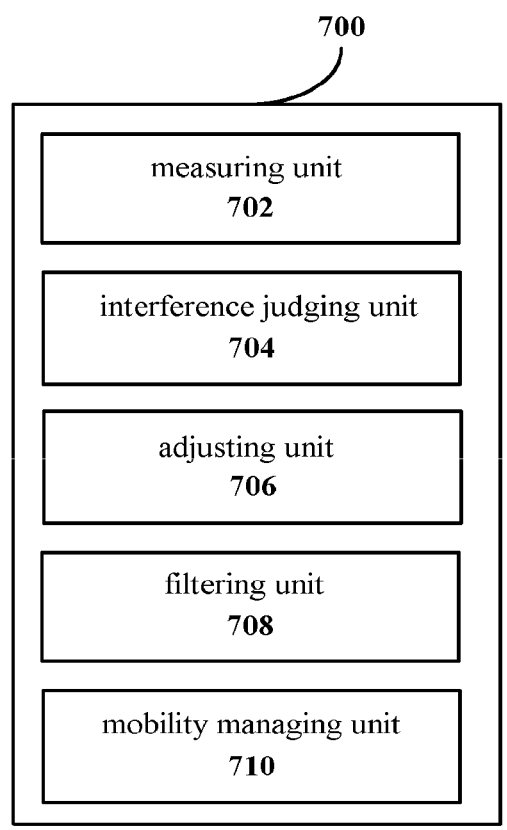
FIG. 7 is a block diagram illustrating another function configuration example of the management device on the user equipment side in a wireless communication system according to an embodiment of the present disclosure.

FIG. 7 is a block diagram illustrating another function configuration example of the management device on the user equipment side in a wireless communication system according to an embodiment of the present disclosure.

As shown in FIG. 7, a management device 700 according to the embodiment may include a measuring unit 702, an interference judging unit 704, an adjusting unit 706, a filtering unit 708 and a mobility managing unit 710. Function configuration examples of the measuring unit 702, the interference judging unit 704, the filtering unit 708 and the mobility managing unit 710 are the same as function configuration examples of the measuring unit 102, the interference judging unit 104, the filtering unit 106 and the mobility managing unit 108 described above, which are not repeated here. Hereinafter only a function configuration example of the adjusting unit 706 is described in detail.

The adjusting unit 706 may be configured to adjust relevant filtering parameters of the filtering unit, so as to reduce influence on the mobility management from the measurement result with high interference.

Specifically, the L3 filtering is expressed as: $F_n = (1-a) \cdot F_{n-1} + a \cdot M_n$, where $M_n$ indicates a measurement result acquired from a preceding physical layer, $F_n$ indicates an updated measurement result after being subject to the filtering operation, $F_{n-1}$ indicates a preceding measurement result after being subject to the filtering operation, $F_0$ is set to be $M_1$, i.e., a measurement result acquired from the physical layer for the first time, and $\alpha$ indicates a predetermined filtering operation coefficient. That is, in a case that the measurement result with high interference satisfies a predetermined condition, the adjusting unit 706 may adjust the parameter $\alpha$, so as to reduce influence of the measurement result with high interference. It should be understood that, such way for adjusting the filtering parameter is only exemplary and is not intended to be limitation, and those skilled in the art may conceive of other ways to enhance the L3 filter, so as to solve the interference problem.

Similarly, the adjusting unit 706 may be further configured to respectively adjust relevant filtering parameters for each measurement result with high interference or collectively adjust relevant filtering parameters for all measurement results with high interference among a predetermined number of measurement results.

It should be noted that herein the process of labeling and reporting the continuous measurement results with high interference described in the embodiment of FIG. 6 may be also applied to this embodiment, which is not repeated here.

According to the above embodiments of the present disclosure, for characteristics of the reference signal and great interference in the small cell and LTE-U scene, an RRM measurement manner suitable for the scene is proposed, enabling to obtain a reliable and accurate measurement result for the mobility management.

It should be understood that, various configurations described in the embodiments described above are merely the preferred embodiments of the present disclosure and are not intended to be limitations, and those skilled in the art may modify the embodiments described above according to the principle of the present disclosure. For example, the embodiments of the present disclosure may be also applied to a non-LTE-U scene naturally, and the user equipment may perform the RRM measurement using the conventional measurement manner or the default relaxed measurement configuration.

The activating/deactivating of the component carriers and the cell handover in the mobility management have been described above. For the cell reselection, it also needs to consider the interference problem for a scene in which a channel quality changes quickly such as the LTE-U frequency band or the like. For example, as described above, the interference may be corrected or the filter parameter may be adjusted to eliminate influence of the interference. Specific processing ways are substantially the same as those in the embodiments described above, which are not repeated here.

Upon the cell reselection, when it is found that continuous measurement results with high interference appear in a certain cell, the cell reselecting unit 1082 may consider lowering a reselection priority of the cell for example.

Figure 8:
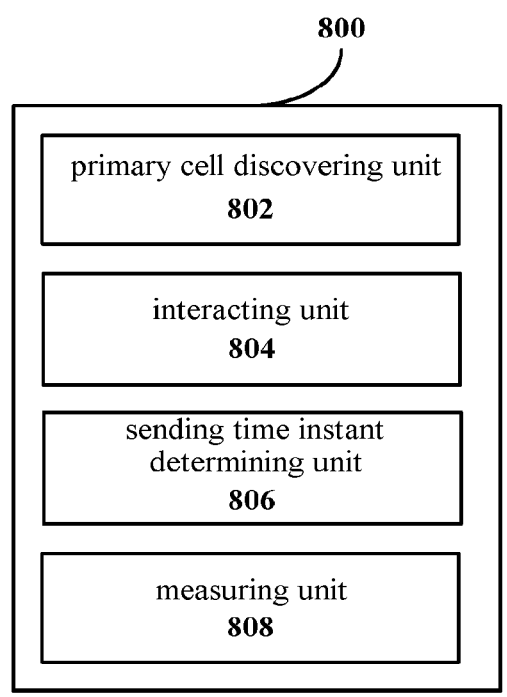
FIG. 8 is a block diagram illustrating a function configuration example of a measurement device on a user equipment side in a wireless communication system according to an embodiment of the present disclosure.

Subsequently, a function configuration example of a measurement device on a user equipment side in a wireless communication system according to an embodiment of the present disclosure is described with reference to FIG. 8. FIG. 8 is a block diagram illustrating a function configuration example of a measurement device on a user equipment side in a wireless communication system according to an embodiment of the present disclosure.

As shown in FIG. 8, a measurement device 800 according to the embodiment may include a primary cell discovering unit 802, an interacting unit 804, a sending time instant determining unit 806 and a measuring unit 808. Subsequently, function configuration examples of respective units are described in detail.

The primary cell discovering unit 802 may be configured to discover a primary cell in a macro cell and obtain a sending time instant at which the primary cell sends a reference signal, where the primary cell is a small cell keeping connection with the user equipment all the time. The reference signal here may include at least one of a discovery reference signal (DRS), a cell-specific reference signal (CRS) and a channel state indicator-reference signal (CSI-RS).

Since the small cell is generally deployed in dense cells or a hot spot region, an "always on" small cell generally exists in such a deployment scene. Such small cell may be considered as a special small cell (i.e., the primary cell), for example a pCell defined in a dual link, which may stably provide services for the user equipment. Therefore, the pCell in the present disclosure serves as a reference relative to which sending time instants of reference signals of other small cells are set, and respective small cells have different offsets of the sending time instants of the reference signals relative to the pCell. The primary cell discovering unit 802 may be configured to discover the primary cell using a default relaxed measurement configuration for the small cell discovery, for example by performing the relaxed measurement as described with reference to FIG. 2 above. In an example, the primary cell discovering unit 802 may be also configured to discover the primary cell using the conventional measurement manners, and the user equipment discovers other small cells by turning to the relaxed measurement manner after discovering the primary cell (determining the time sequence of the reference signal of the primary cell). Since the user equipment discovers the primary cell with no reference information, discovery efficiency can be improved with the compact conventional measurement manner. After determining the time sequence of the primary cell (a reference for other cells), the user equipment may set the relaxed measurement manners for other small cells, thereby realizing the small cell discovery in an energy saving and efficient manner.

The interacting unit 804 may be configured to interact with a macro base station corresponding to the macro cell or a base station corresponding to the primary cell so as to obtain a reference signal measurement timing configuration for respective small cells in a predetermined range (for example in a macro cell covering the primary cell) with the time sequence of the primary cell as a reference, where the reference signal measurement timing configuration includes measuring cycles for the reference signals of all small cells in the predetermined range (for example in the macro cell) and offsets between sending time instants at which other small cells send the reference signals and the sending time instants at which the primary cell sends the reference signal. Preferably, all small cells in the macro cell support an ON/OFF mechanism.

The sending time instant determining unit 806 may be configured to determine the sending time instants at which other small cells send the reference signal according to the sending time instant at which the primary cell sends the reference signal and the determined offsets.

The measuring unit 808 may be configured to measure, for each small cell, the reference signal of the small cell by aligning a measuring time instant at which the reference signal of the small cell is measured with a sending time instant at which the small cell sends the reference signal. Preferably, the measuring unit 808 may be configured to measure the reference signal in a relaxed measurement manner.

Specifically, the measuring unit 808 may measure the reference signal by aligning a duration of each of measuring gaps in a burst gap of the relaxed measurement manner with the sending time instant, configuring an interval among the measuring gaps of the relaxed measurement manner as integral multiples of a measuring cycle for the reference signal, and configuring the burst gap of the relaxed measurement manner as integral multiples of the interval among the measuring gaps.

Figure 9:
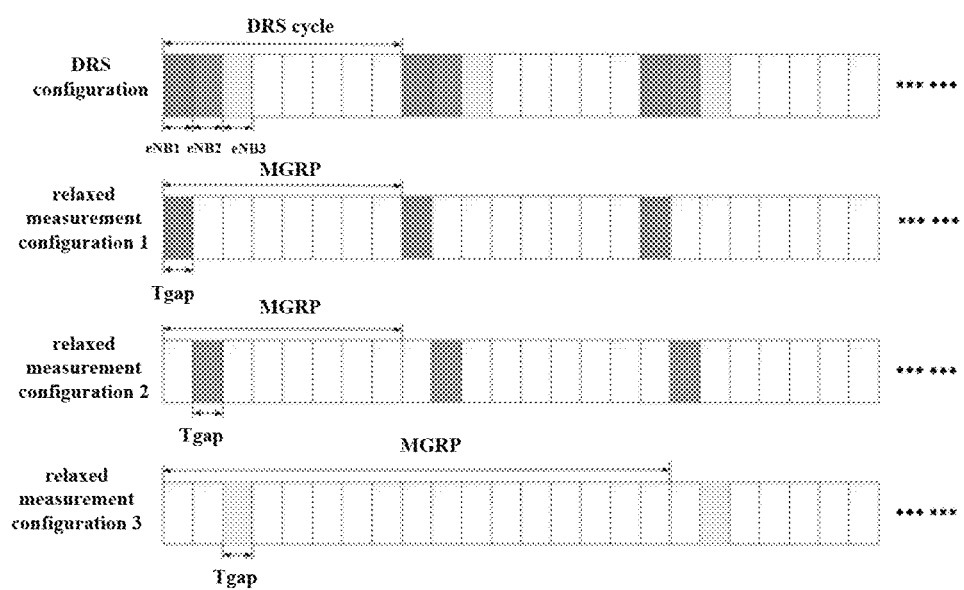
FIG. 9 is a schematic diagram illustrating a reference signal measurement timing configuration based on a relaxed measurement manner according to an embodiment of the present disclosure.

FIG. 9 shows an example of a reference signal measuring timing configuration based on a relaxed measurement manner according to an embodiment of the present disclosure.

As shown in FIG. 9, regarding the offset, the duration $T_{gap}$ of each of measuring gaps in the burst gap of the relaxed measurement manner is aligned with a time instant at which a corresponding measured cell sends a DRS; and regarding the cycle, the interval MGRP among the measuring gaps of the relaxed measurement manner is configured to be the same as a DRS cycle (40/80/160 ms) of the corresponding measured cell (for example eNB1 and eNB2 in FIG. 9) or be integral multiples of the DRS cycle of the corresponding measured cell (for example eNB3 in FIG. 9). In addition, the burst gap $T_{burst}$ of the relaxed measurement manner is configured as integral multiples of the MGRP, to ensure the DRS of a corresponding cell can be measured in each burst gap of the relaxed measurement manner.

As can be seen from the above description, the DRS is not the "always on" reference signal, thus using of the relaxed measurement manner enables the use equipment to perform the RRM measurement for the DRS with a low power consumption. However, the measuring time of the relaxed measurement manner occupies a small part of a whole cycle, therefore measurement may be performed by aligning the measuring time instant with the time instant for sending the DRS, so as to ensure the DRS of the target cell can be measured reliably. In this way, the power consumption of the user equipment can be reduced, while ensuring reliable and accurate measurement.

Figure 10:
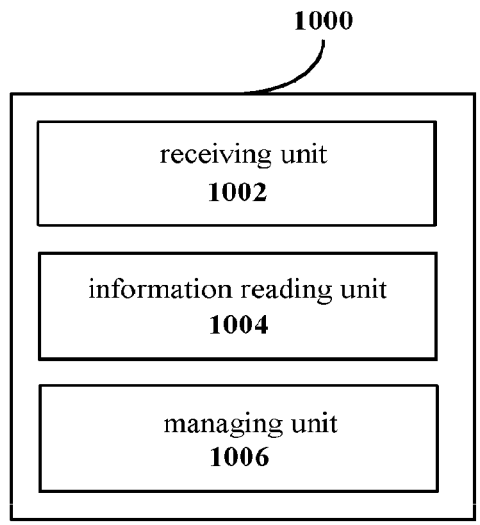
FIG. 10 is a block diagram illustrating a function configuration example of a management device on a base station side in a wireless communication system according to an embodiment of the present disclosure.

Hereinafter a function configuration example of a management device on a base station side in a wireless communication system according to an embodiment of the present disclosure is described with reference to FIG. 10. FIG. 10 is a block diagram illustrating a function configuration example of a management device on a base station side in a wireless communication system according to an embodiment of the present disclosure.

As shown in FIG. 10, a management device 1000 according to the present embodiment may include a receiving unit 1002, an information reading unit 1004 and a managing unit 1006. Subsequently function configuration examples of respective units are described in detail.

The receiving unit 1002 may be configured to receive a radio resource management measurement report reported by the user equipment, the measurement report including a measurement result for a reference signal of a target cell measured by the user equipment.

The information reading unit 1004 may be configured to read information on a measuring result with high interference, the interference of which satisfies a predetermined condition, included in the measurement report.

As described in the above embodiments, the user equipment may include the statistical information on the measurement result with high interference (for example the number of continuous measurement results with high interference, the number of measurement results with high interference appearing in a predetermined time period, and the like) in the measurement report to be reported to the base station.

The managing unit 1006 may be configured to perform radio resource management on the user equipment based on the measurement report, for example mobility management such as adding, deleting, activating and deactivating of component carriers and cell handover, and resource scheduling schemes such as power control, channel allocation and load control. Specifically, the managing unit 1006 may control the user equipment to for example deactivate a corresponding component carrier, perform handover to a suitable target cell or the like, according to the RRM measurement results for the reference signals of respective cells.

Further, the managing unit 1006 may be configured to perform for example the mobility management on the user equipment according to information related to the measurement result with high interference included in the measurement report For example, for a certain event reported by the user equipment, the base station further determines the mobility management scheme based on whether a measurement result related to the event includes the short-time high interference. Specifically, for example, if the base station receives an A2 event regarding the SCC on an unlicensed frequency band which is reported by the user equipment, the managing unit 1006 further determines the A2 event is triggered due to the short-time high interference according to the statistical information on the measurement result with high interference included in the measurement report, and thus determines there is no need to deactivate the corresponding SCC, thereby avoiding an inappropriate deactivating operation.

For example, for certain cells with high interference, the base station may not set the cells as a handover target cell for the user equipment, or the base station may select an appropriate cell as the handover target cell for the user equipment based on the interference conditions of respective cells.

In addition, based on the information related to the measurement result with high interference (for example, the statistical information on the measurement result with high interference), the base station may add a cell the interference condition of which satisfies a predetermined condition (for example the number of continuous measurement results with high interference being greater than a predetermined threshold) to a blacklist, and may refer to the blacklist when performing measurement configuration for other user equipment thereafter.

It should be noted that, the blacklist is time limited, and a valid time period thereof may be set according to a judging standard for the measurement result with high interference for example. For example, if all of a predetermined number of continuous measurement results of a cell in the blacklist are not the measurement results with high interference, it may be considered to remove the cell from the blacklist.

It should be understood that, since the user equipment needs to report information on the measurement result with high interference to the base station, the base station needs to consider configuration related to the reporting of the measurement result with high interference when performing measurement configuration for the user equipment.

Figure 11:
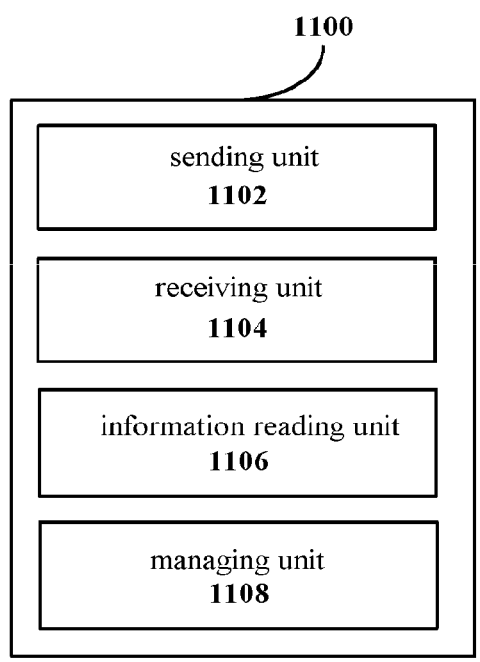
FIG. 11 is a block diagram illustrating another function configuration example of the management device on the base station side in a wireless communication system according to an embodiment of the present disclosure.

Hereinafter another function configuration example of the management device on the base station side in a wireless communication system according to an embodiment of the present disclosure is described with reference to FIG. 11. FIG. 11 is a block diagram illustrating another function configuration example of the management device on the base station side in a wireless communication system according to an embodiment of the present disclosure.

As shown in FIG. 11, a management device 1100 according to the embodiment may include a sending unit 1102, a receiving unit 1104, an information reading unit 1106 and a managing unit 1108. Function configurations of the receiving unit 1104, the information reading unit 1106 and the managing unit 1108 are the same as the function configurations of the receiving unit 1002, the information reading unit 1004 and the managing unit 1006 described above, which are not repeated here. Hereinafter only a function configuration example of the sending unit 1102 is described in detail.

The sending unit 1102 is configured to send configuration signaling to the user equipment. The configuration signaling includes measurement configuration information for the user equipment to perform radio resource management measurement on a reference signal of a target cell, and the measurement configuration information includes configuration information related to the reporting of the measurement result with high interference.

Preferably, the configuration information related to the reporting of the measurement result with high interference includes reporting rule configuration information, and the reporting rule configuration information includes configuration information related to the reporting of a measurement result of a target cell for which the statistical information on the measurement result with high interference satisfies the predetermined condition.

Specifically, for example, the reporting rule configuration information may include that: regarding the measurement result for the reference signal of the target cell, if a predetermined number of measurement results with high interference appear continuously or if the number of the measurement results with high interference appearing in a predetermined time period is greater than a predetermined number, the user equipment does not need to report the measurement result for the target cell, and thus the base station will not set the target cell as the handover target cell for the user equipment. Alternatively, the reporting rule configuration information may further include that: regarding the measurement result for the reference signal of the target cell, if a predetermined number of measurement results with high interference appear continuously or if the number of the measurement results with high interference appearing in a predetermined time period is greater than a predetermined number, the user equipment needs to report the statistical information on the measurement results with high interference to the base station when reporting the measurement result, so that the base station makes a corresponding handover decision according to actual conditions and measurement results of other cells. As another example, the reporting rule configuration information may include that: regarding a measurement result for a reference signal of a secondary cell providing services currently, if no predetermined number of measurement results with high interference continuously appear or if the measurement results with high interference appearing in a predetermined time period is less than a predetermined number, in other words, if the interference is determined as the short-time high interference, the user equipment does not need to report a certain event about the secondary cell, thereby saving signaling resources. It should be understood that, the reporting rule configuration information described here is only exemplary and is not intended to limit, and those skilled in the art may appropriately configure the reporting rule as required.

In addition, preferably, the configuration information related to the reporting of the measurement results with high interference may further include configuration information related to a reporting format and so on, for example a position of the information on the measurement result with high interference in the measurement report, a representation manner or the like.

In this way, the user equipment may return a corresponding measurement report according to the measurement configuration information from the base station.

Although the function configuration examples of the management device and the measurement device on the user equipment side and the management device on the base station side in a wireless communication system according to the embodiments of the present disclosure have been described above, it should be understood that, the above description is only exemplary and is not intended to limit, and those skilled in the art may modify the above embodiments according to the principles of the present disclosure. For example, the functional modules in respective embodiments may be added, deleted and/or combined or the like, and such modifications all fall within the scope of the present disclosure.

Corresponding to the devices according to the embodiments of the present disclosure, methods in a wireless communication system are further provided. Procedure examples of the methods in a wireless communication system according to embodiments of the present disclosure are described with reference to FIG. 12 to FIG. 14 hereinafter.

Figure 12:
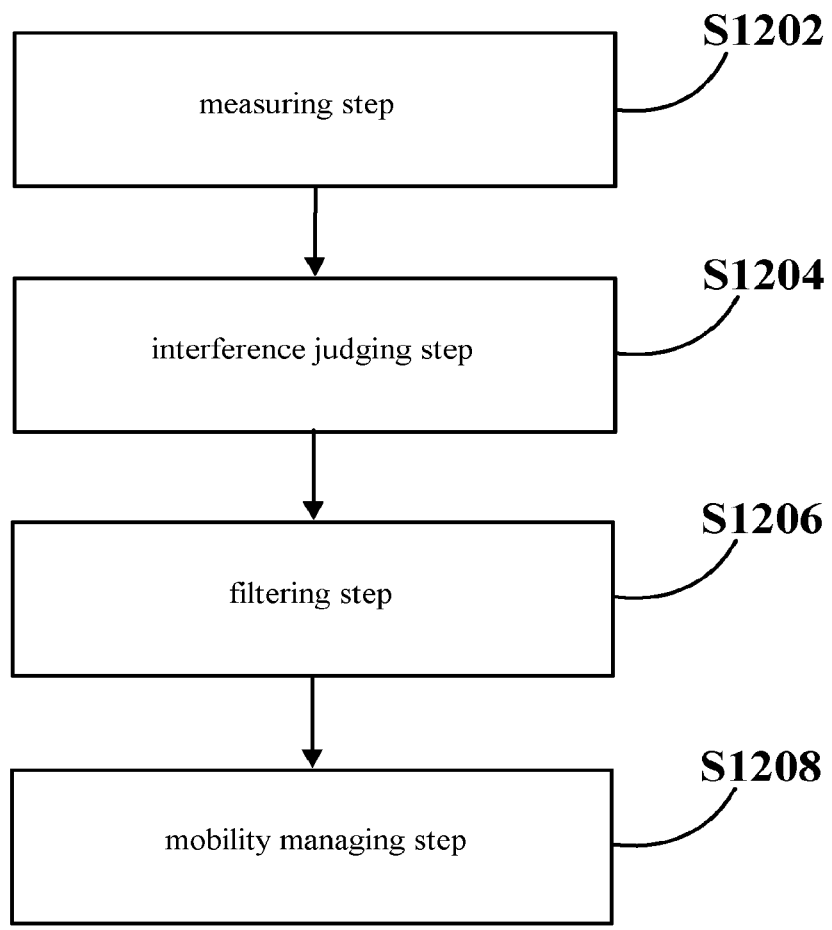
FIG. 12 is a flowchart illustrating a processing procedure example of a management method on a user equipment side in a wireless communication system according to an embodiment of the present disclosure.

Firstly, a processing procedure example of a management method on a user equipment side in a wireless communication system according to an embodiment of the present disclosure is described with reference to FIG. 12. FIG. 12 is a flowchart illustrating a processing procedure example of a management method on a user equipment side in a wireless communication system according to an embodiment of the present disclosure.

As shown in FIG. 12, the management method on the user equipment side according to the embodiment may include a measuring step S1202, an interference judging step S1204, a filtering step S1206 and a mobility managing step S1208 Hereinafter processing examples of respective steps are described.

In the measuring step S1202, radio resource managing measurement may be performed on a reference signal of a target cell. Preferably, the target cell here may be a small cell and support operating in an LTE-U frequency band. In addition, preferably, the reference signal here may be a signal including a pilot sequence, and may include for example at least one of DRS, CRS and CSI-RS. In addition, the reference signal may include other reference signals which may appear in the future.

Preferably, in the measuring step S1202, the RRM measurement may be performed on the reference signal on the LTE-U frequency band in such a manner that the measuring time instant is aligned with a time instant at which the target cell sends the reference signal. Further preferably, the reference signal may be measured in a so-called relaxed measurement manner.

In the interference judging step S1204, it may be determined whether the interference in the measurement result satisfies a predetermined condition, and a measurement result the interference of which satisfies the predetermined condition may be labeled as a measurement result with high interference.

Subsequently, in the filtering step S1206, Layer-3 filtering may be performed on the measurement result.

Subsequently, in the mobility managing step S1208, mobility management may be performed on the user equipment based on the measurement result with high interference.

The mobility management here may include adding/deleting and activating/deactivating of component carriers and cell handover in a case that the user equipment is in a connected state, and cell reselection in a case that the user equipment is in an idle state. In a case of performing the cell handover, it needs to report a measurement report including the measurement result to a base station, while in a case of performing the cell reselection, reporting is not needed and the user equipment selects an appropriate cell according to the measurement result.

Preferably, in order to eliminate influence of the interference on the mobility management, the measurement result with high interference may be corrected or relevant filtering parameters of a Layer-3 filter may be adjusted.

According to the embodiment of the present disclosure, accurate and reliable measurement for the reference signal can be realized in the small cell scene, while enabling the user equipment to perform measurement with low power consumption.

Figure 13:
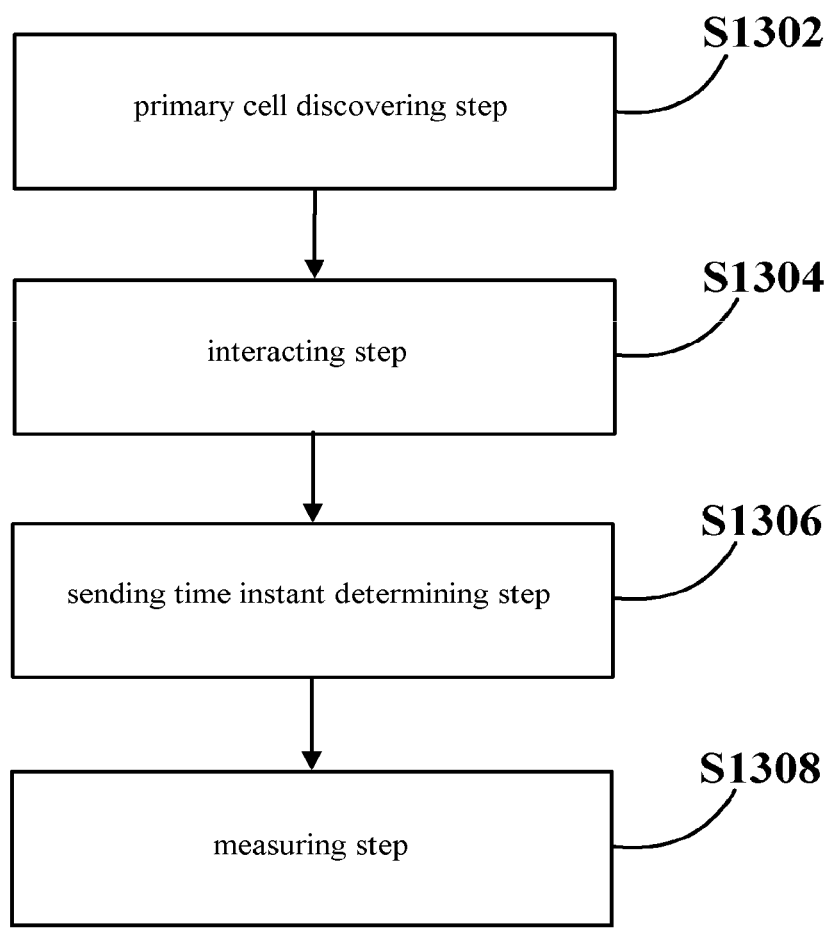
FIG. 13 is a flowchart illustrating a processing procedure example of a measurement method on a user equipment side in a wireless communication system according to an embodiment of the present disclosure.

Subsequently, a processing procedure example of a measurement method on a user equipment side in a wireless communication system according to an embodiment of the present disclosure is described with reference to FIG. 13. FIG. 13 is a flowchart illustrating a processing procedure example of a measurement method on a user equipment side in a wireless communication system according to an embodiment of the present disclosure.

As shown in FIG. 13, the measurement method on the user equipment side according to the embodiment may include: a primary cell discovering step S1302, an interacting step S1304, a sending time instant determining step S1306 and a measuring step S1308. Subsequently processing in respective steps is described in detail.

In the primary cell discovering step S1302, a primary cell in a macro cell may be discovered and a sending time instant at which the primary cell sends a reference signal is obtained, where the primary cell is a small cell keeping connection with the user equipment all the time. Preferably, the primary cell may be discovered with a default relaxed measurement configuration or a conventional measurement manner, and all small cells in the macro cell support an ON/OFF mechanism. In addition, preferably, the reference signal may include at least one of DRS, CRS and CSI-RS, and may further include any other reference signals which may appear in the future.

Subsequently, in the interacting step S1304, interaction with a macro base station corresponding to the macro cell or a base station corresponding to the primary cell may be performed, so as to obtain a reference signal measurement timing configuration of respective cells in a predetermined range (for example, in the macro cell covering the primary cell) with a time sequence of the primary cell as a reference. The reference signal measurement timing configuration include measurement cycles of reference signals of all the small cells in the predetermined range (for example in the macro cell) and offsets between sending time instants at which other small cells send the reference signals and a sending time instant at which the primary cell sends the reference signal.

Subsequently, in the sending time instant determining step S1306, the sending time instants at which other small cells send the reference signals may be determined according to the sending time instant at which the primary cell sends the reference signal and the offsets.

Subsequently, in the measuring step S1308, for each small cell, a reference signal of the small cell may be measured by aligning a measuring time instant at which the reference signal of the small cell is measured with a sending time instant at which the small cell sends the reference signal. Preferably, the reference signal may be measured in a so-called relaxed measurement manner so as to reduce power consumption of the user equipment.

According to the embodiment of the present disclosure, for characteristics of the reference signal (for example the discovery reference signal) in the small cell scene, measurement is performed by aligning the measuring time instant with the sending time instant, such that the reference signal can be measured reliably within the measurement cycle and the power consumption of the user equipment can also be reduced in the relaxed measurement manner.

Figure 14:
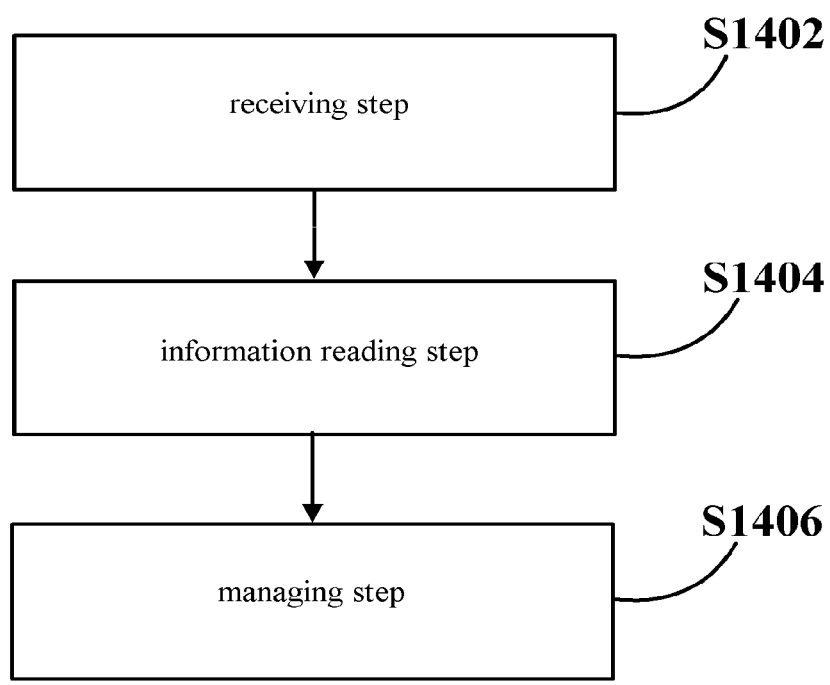
FIG. 14 is a flowchart illustrating a processing procedure example of a management method on a base station side in a wireless communication system according to an embodiment of the present disclosure.

Subsequently a processing example of a management method on a base station side in a wireless communication system according to an embodiment of the present disclosure is described with reference to FIG. 14. FIG. 14 is a flowchart illustrating a processing procedure example of a management method on a base station side in a wireless communication system according to an embodiment of the present disclosure.

As shown in FIG. 14, the management method on the base station side according to the embodiment may include a receiving step S1402, an information reading step S1404 and a managing step S1406. Subsequently processing in respective steps is described in detail.

In the receiving step S1402, a radio resource management measurement report reported by user equipment may be received, where the measurement report includes a measurement result for a reference signal of a target cell measured by the user equipment.

Subsequently, in the information reading step S1404, information related to a measurement result with high interference, the interference of which satisfies a predetermined condition, included in the measurement report may be read.

Subsequently, in the managing step S1406, radio resource management may be performed on the user equipment based on the measurement report, for example mobility management such as adding, deleting, activating and deactivating of component carriers and cell handover, and resource scheduling schemes such as power control, channel allocation and load control. Preferably, for example, the mobility management may be performed on the user equipment based on the information related to the measurement result with high interference included in the measurement report.

It should be understood that, preferably, since the user equipment reports the information related to the measurement result with high interference (for example statistical information on the measurement result with high interference or the like) to the base station, the measurement configuration for the user equipment made by the base station necessarily includes configuration information related to reporting of the measurement result with high interference, and the user equipment returns a corresponding measurement report according to the configuration information. Preferably, the configuration information may include reporting rule configuration information related to reporting of a measurement result of a cell for which the statistical information on the measurement result with high interference satisfies a predetermined condition, a corresponding reporting format and so on.

It should be noted that, although the procedure examples of the methods in the wireless communication system according to the embodiments of the present disclosure are described above, the examples are only exemplary and are not intended to be limitation. Those skilled in the art may modify the above embodiments according to the principle of the present disclosure, for example, add, delete, combine or the like the steps in various embodiments, and such modifications all fall within the scope of the present disclosure.

In addition, it should be further noted that, the method embodiments here correspond to the device embodiments described above, therefore contents which are not described in detail in the method embodiments may be referred to the corresponding descriptions in the device embodiments, and will not be repeated here.

In addition, according to an embodiment of the present disclosure, an electronic apparatus is further provided, which may include one or more processors configured to perform the management method and the measurement method on the user equipment side and the management method on the base station side in the wireless communication system according to the embodiments of the present disclosure described above.

It should be understood that machine executable instructions in a storage medium and a program product according to an embodiment of the present disclosure may be configured to perform the methods corresponding to the device embodiments, and hence the contents which are not described in detail here may be referred to corresponding descriptions above, and are not repeated here.

Accordingly, a storage medium on which the above program product storing machine executable instructions is carried is also included in the disclosure of the invention.

The storage medium includes but not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1500 illustrated in FIG. 15, which can perform various functions when various programs are installed thereon.

Figure 15:
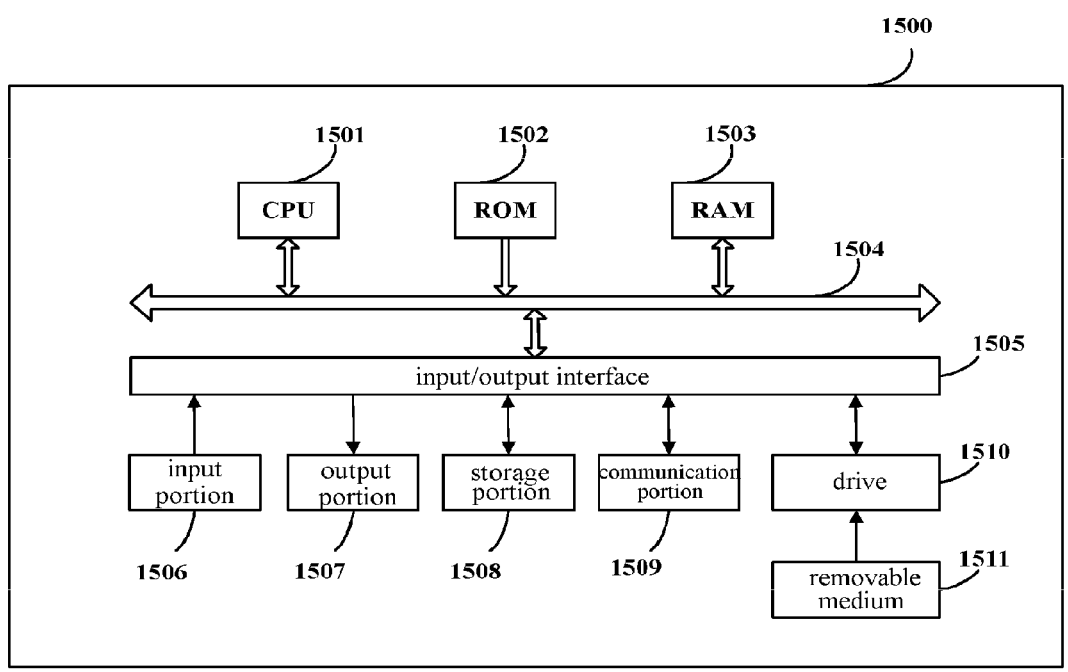
FIG. 15 is a block diagram illustrating an exemplary structure of a personal computer functioning as an information processing apparatus that may be adopted in an embodiment of the present disclosure.

In FIG. 15, a Central Processing Unit (CPU) 1501 performs various processes according to a program stored in a Read Only Memory (ROM) 1502 or loaded from a storage portion 1508 into a Random Access Memory (RAM) 1503 in which data required when the CPU 1501 performs the various processes is also stored as needed.

The CPU 1501, the ROM 1502 and the RAM 1503 are connected to each other via a bus 1504 to which an input/output interface 1505 is also connected.

The following components are connected to the input/output interface 1505: an input portion 1506 including a keyboard, a mouse, etc.; an output portion 1507 including a display, e.g., a Cathode Ray Tube (CRT), a Liquid Crystal Display (LCD), etc., a speaker, etc.; a storage portion 1508 including a hard disk, etc.; and a communication portion 1509 including a network interface card, e.g., an LAN card, a modem, etc. The communication portion 1509 performs a communication process over a network, e.g., the Internet.

A drive 1510 is also connected to the input/output interface 1505 as needed. A removable medium 1511, e.g., a magnetic disk, an optical disk, an magneto optical disk, a semiconductor memory, etc., can be installed on the drive 1510 as needed so that a computer program fetched therefrom can be installed into the storage portion 1508 as needed.

In the case that the foregoing series of processes are performed in software, a program constituting the software is installed from a network, e.g., the Internet, etc., or a storage medium, e.g., the removable medium 1511, etc.

Those skilled in the art shall appreciate that such a storage medium will not be limited to the removable medium 1511 illustrated in FIG. 15 in which the program is stored and which is distributed separately from the apparatus to provide a user with the program. Examples of the removable medium 1511 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1502, a hard disk included in the storage portion 1508, etc., in which the program is stored and which is distributed together with the apparatus including the same to the user.

Hereinafter application examples of the present disclosure are described with reference to FIG. 16 to FIG. 18.

APPLICATION EXAMPLES REGARDING A BASE STATION

First Application Example

Figure 16:
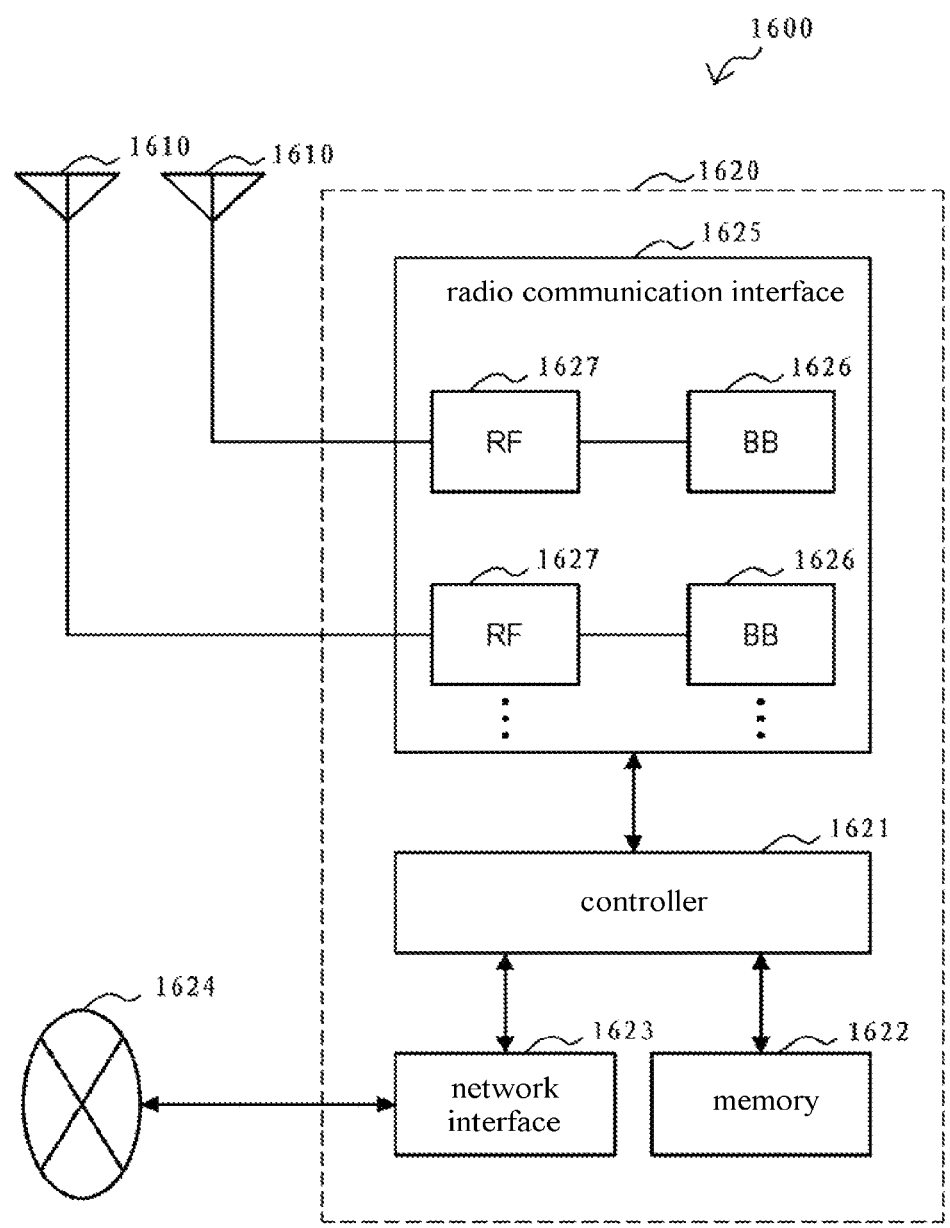
FIG. 16 is a block diagram illustrating a first example of schematic configuration of an evolved node B (eNB) to which the technology of the present disclosure may be applied.

FIG. 16 is a block diagram illustrating a first example of a schematic configuration of an eNB to which the technology of the present disclosure may be applied. An eNB 1600 includes one or more antennas 1610 and a base station apparatus 1620. Each antenna 1610 and the base station apparatus 1620 may be connected to each other via an RF cable.

Each of the antennas 1610 includes a single or multiple antenna elements (such as multiple antenna elements included in a multiple input multiple output (MIMO) antenna), and is used for the base station apparatus 1620 to transmit and receive radio signals. The eNB 1600 may include multiple antennas 1610, as illustrated in FIG. 16. For example, the multiple antennas 1610 may be compatible with multiple frequency bands used by the eNB 1600. Although FIG. 16 illustrates the example in which the eNB 1600 includes the multiple antennas 1610, the eNB 1600 may also include a single antenna 1610.

The base station apparatus 1620 includes a controller 1621, a memory 1622, a network interface 1623, and a radio communication interface 1625.

The controller 1621 may be, for example, a CPU or a DSP, and operates various functions of a higher layer of the base station apparatus 1620. For example, the controller 1621 generates a data packet from data in signals processed by the radio communication interface 1625, and transfers the generated packet via the network interface 1623. The controller 1621 may bundle data from multiple base band processors to generate the bundled packet, and transfer the generated bundled packet. The controller 1621 may have logical functions of performing control such as radio resource control, radio bearer control, mobility management, admission control, and scheduling. The control may be performed in corporation with an eNB or a core network node in the vicinity. The memory 1622 includes RAM and ROM, and stores a program that is executed by the controller 1621 and various types of control data (such as a terminal list, transmission power data, and scheduling data).

The network interface 1623 is a communication interface for connecting the base station apparatus 1620 to a core network 1624. The controller 1621 may communicate with a core network node or another eNB via the network interface 1623. In that case, the eNB 1600, and the core network node or the other eNB may be connected to each other through a logical interface (such as an S1 interface and an X2 interface). The network interface 1623 may also be a wired communication interface or a radio communication interface for radio backhaul. If the network interface 1623 is a radio communication interface, the network interface 1623 may use a higher frequency band for radio communication than a frequency band used by the radio communication interface 1625.

The radio communication interface 1625 supports any cellular communication scheme such as Long Term Evolution (LTE) and LTE-Advanced, and provides radio connection to a terminal positioned in a cell of the eNB 1600 via the antenna 1610. The radio communication interface 1625 may typically include, for example, a baseband (BB) processor 1626 and an RF circuit 1627. The BB processor 1626 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1626 may have a part or all of the above-described logical functions instead of the controller 1621. The BB processor 1626 may be a memory that stores a communication control program, or a module that includes a processor and a related circuit configured to execute the program. Updating the program may allow the functions of the BB processor 1626 to be changed. The module may be a card or a blade that is inserted into a slot of the base station apparatus 1620. Alternatively, the module may also be a chip that is mounted on the card or the blade. Meanwhile, the RF circuit 1627 may include, for example, a mixer, a filter and an amplifier, and transmits and receives radio signals via the antenna 1610.

The radio communication interface 1625 may include multiple BB processors 1626, as illustrated in FIG. 16. For example, the multiple BB processors 1626 may be compatible with multiple frequency bands used by the eNB 1600. The radio communication interface 1625 may include the multiple RF circuits 1627, as illustrated in FIG. 16. For example, the multiple RF circuits 1627 may be compatible with multiple antenna elements. Although FIG. 16 illustrates the example in which the radio communication interface 1625 includes the multiple BB processors 1626 and the multiple RF circuits 1627, the radio communication interface 1625 may also include a single BB processor 1626 or a single RF circuit 1627.

Second Application Example

Figure 17:
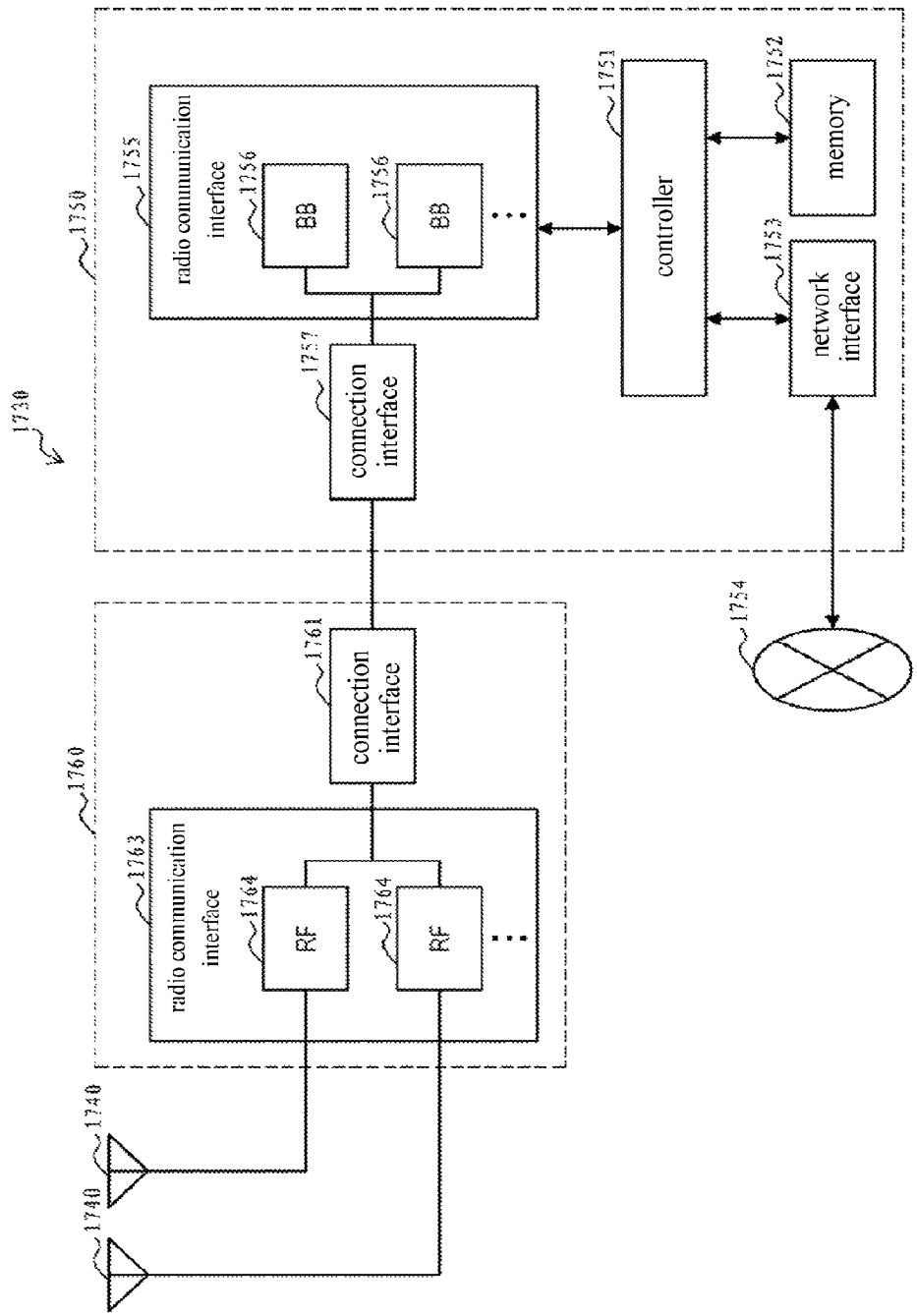
FIG. 17 is a block diagram illustrating a second example of schematic configuration of the eNB to which the technology of the present disclosure may be applied.

FIG. 17 is a block diagram illustrating a second example of a schematic configuration of an eNB to which the technology of the present disclosure may be applied. An eNB 1730 includes one or more antennas 1740, a base station apparatus 1750, and an RRH 1760. Each antenna 1740 and the RRH 1760 may be connected to each other via an RF cable. The base station apparatus 1750 and the RRH 1760 may be connected to each other via a high speed line such as an optical fiber cable.

Each of the antennas 1740 includes a single or multiple antenna elements (such as multiple antenna elements included in an MEM antenna), and is used for the RRH 1760 to transmit and receive radio signals. The eNB 1730 may include multiple antennas 1740, as illustrated in FIG. 17. For example, the multiple antennas 1740 may be compatible with multiple frequency bands used by the eNB 1730. Although FIG. 17 illustrates the example in which the eNB 1730 includes the multiple antennas 1740, the eNB 1730 may also include a single antenna 1740.

The base station apparatus 1750 includes a controller 1751, a memory 1752, a network interface 1753, a radio communication interface 1755, and a connection interface 1757. The controller 1751, the memory 1752, and the network interface 1753 are the same as the controller 1621, the memory 1622, and the network interface 1623 described with reference to FIG. 16.

The radio communication interface 1755 supports any cellular communication scheme such as LTE and LTE-Advanced, and provides radio communication to a terminal positioned in a sector corresponding to the RRH 1760 via the RRH 1760 and the antenna 1740. The radio communication interface 1755 may typically include, for example, a BB processor 1756. The BB processor 1756 is the same as the BB processor 1626 described with reference to FIG. 16, except the BB processor 1756 is connected to the RF circuit 1764 of the RRH 1760 via the connection interface 1757. The radio communication interface 1755 may include multiple BB processors 1756, as illustrated in FIG. 17. For example, the multiple BB processors 1756 may be compatible with multiple frequency bands used by the eNB 1730. Although FIG. 17 illustrates the example in which the radio communication interface 1755 includes the multiple BB processors 1756, the radio communication interface 1755 may also include a single BB processor 1756.

The connection interface 1757 is an interface for connecting the base station apparatus 1750 (the radio communication interface 1755) to the RRH 1760. The connection interface 1757 may also be a communication module for communication in the above-described high speed line that connects the base station apparatus 1750 (the radio communication interface 1755) to the RRH 1760.

The RRH 1760 includes a connection interface 1761 and a radio communication interface 1763.

The connection interface 1761 is an interface for connecting the RRH 1760 (radio communication interface 1763) to the base station apparatus 1750. The connection interface 1761 may also be a communication module for communication in the above-described high speed line.

The radio communication interface 1763 transmits and receives radio signals via the antenna 1740. The radio communication interface 1763 may typically include, for example, the RF circuit 1764. The RF circuit 1764 may include, for example, a mixer, a filter and an amplifier, and transmits and receives radio signals via the antenna 1740. The radio communication interface 1763 may include multiple RF circuits 1764, as illustrated in FIG. 17. For example, the multiple RF circuits 1764 may support multiple antenna elements. Although FIG. 17 illustrates the example in which the radio communication interface 1763 includes the multiple RF circuits 1764, the radio communication interface 1763 may also include a single RF circuit 1764.

In the eNB 1600 and the eNB 1730 illustrated in FIGS. 16 and 17, the receiving unit 1002, the sending unit 1102 and the receiving unit 1104 described by using FIGS. 10 and 11 may be implemented by the radio communication interface 1625, and the radio communication interface 1755 and/or the radio communication interface 1763. At least a part of the functions may also be implemented by the controller 1621 and the controller 1751.

Application Example Regarding User Equipment

First Application Example

Figure 18:
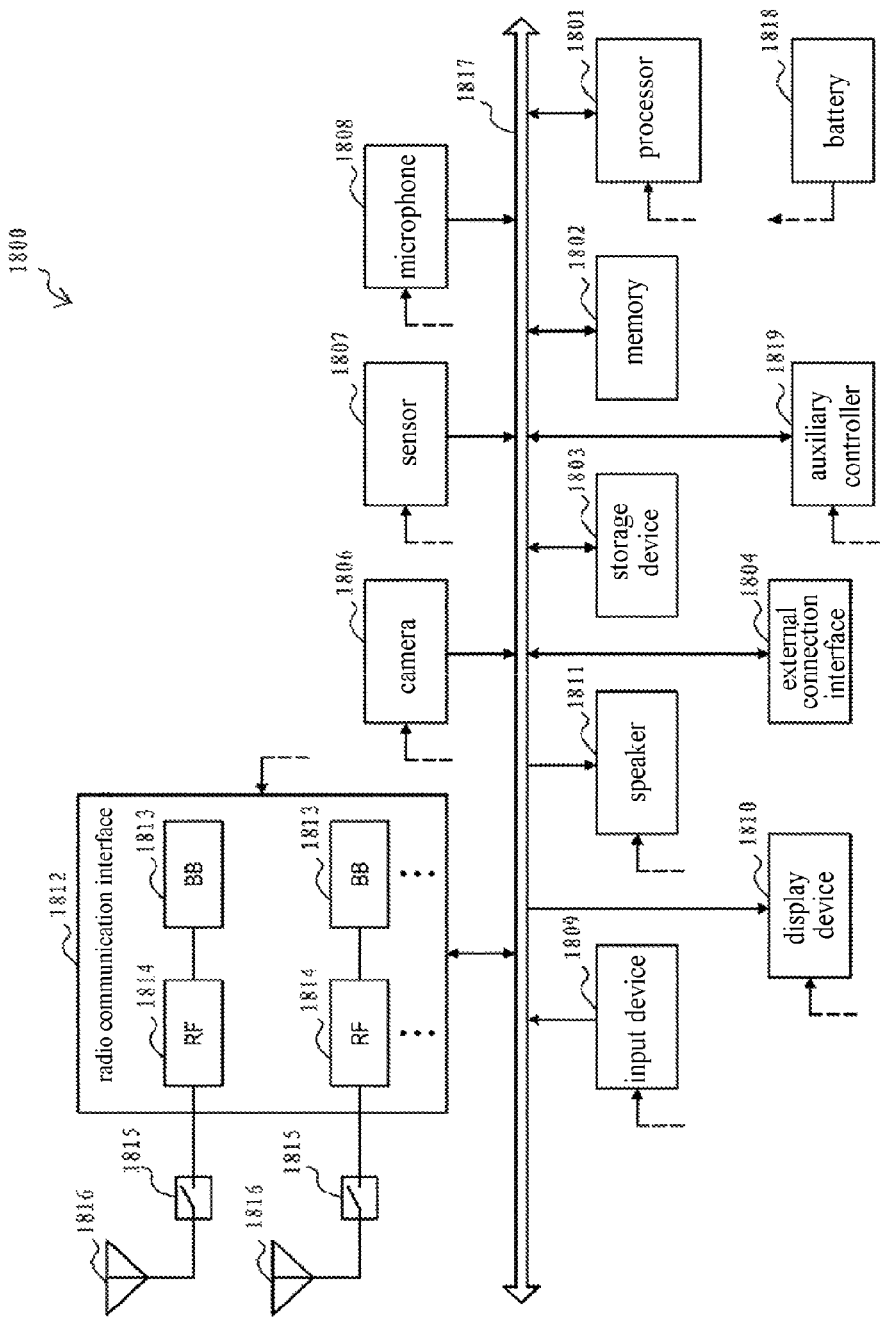
FIG. 18 is a block diagram illustrating an example of schematic configuration of a smartphone to which the technology of the present disclosure may be applied.

FIG. 18 is a block diagram illustrating an example of a schematic configuration of a smartphone 1800 to which the technology of the present disclosure may be applied. The smartphone 1800 includes a processor 1801, a memory 1802, a storage device 1803, an external connection interface 1804, a camera 1806, a sensor 1807, a microphone 1808, an input device 1809, a display device 1810, a speaker 1811, a radio communication interface 1812, one or more antenna switches 1815, one or more antennas 1816, a bus 1817, a battery 1818, and an auxiliary controller 1819.

The processor 1801 may be, for example, a CPU or a system on a chip (SoC), and controls functions of an application layer and another layer of the smartphone 1800. The memory 1802 includes RAM and ROM, and stores a program that is executed by the processor 1801, and data. The storage device 1803 may include a storage medium such as a semiconductor memory and a hard disk. The external connection interface 1804 is an interface for connecting an external device such as a memory card and a universal serial bus (USB) device to the smartphone 1800.

The camera 1806 includes an image sensor such as a charge coupled device (CCD) and a complementary metal oxide semiconductor (CMOS), and generates a captured image. The sensor 1807 may include a group of sensors such as a measurement sensor, a gyro sensor, a geomagnetic sensor, and an acceleration sensor. The microphone 1808 converts sounds that are input to the smartphone 1800 to audio signals. The input device 1809 includes, for example, a touch sensor configured to detect touch onto a screen of the display device 1810, a keypad, a keyboard, a button or a switch, and receives an operation or information input from a user. The display device 1810 includes a screen such as a liquid crystal display (LCD) and an organic light-emitting diode (OLED) display, and displays an output image of the smartphone 1800. The speaker 1811 converts audio signals that are output from the smartphone 1800 to sounds.

The radio communication interface 1812 supports any cellular communication scheme such as LTE and LTE-Advanced, and performs radio communication. The radio communication interface 1812 may typically include, for example, a BB processor 1813 and an RF circuit 1814. The BB processor 1813 may perform, for example, encoding/decoding, modulating/demodulating and multiplexing/demultiplexing, and performs various types of signal processing for radio communication. Meanwhile, the RF circuit 1814 may include, for example, a mixer, a filter, and an amplifier, and transmits and receives radio signals via the antenna 1816. The radio communication interface 1812 may be one chip module having the BB processor 1813 and the RF circuit 1814 integrated thereon. The radio communication interface 1812 may include multiple BB processors 1813 and the multiple RF circuits 1814, as illustrated in FIG. 18. Although FIG. 18 illustrates the example in which the radio communication interface 1812 includes the multiple BB processors 1813 and the multiple RF circuits 1814, the radio communication interface 1812 may also include a single BB processor 1813 or a single RF circuit 1814.

Furthermore, in addition to the cellular communication scheme, the radio communication interface 1812 may support another type of radio communication scheme such as a short-distance wireless communication scheme, a near field communication scheme, and a wireless local area network (LAN) scheme. In that case, the radio communication interface 1812 may include the BB processor 1813 and the RF circuit 1814 for each radio communication scheme.

Each of the antenna switches 1815 switches connection destinations of the antennas 1816 among multiple circuits (such as circuits for different radio communication schemes) included in the radio communication interface 1812.

Each of the antennas 1816 includes a single or multiple antenna elements (such as multiple antenna elements included in a MIMO antenna), and is used for the radio communication interface 1812 to transmit and receive radio signals. The smartphone 1800 may include multiple antennas 1816, as illustrated in FIG. 18. Although FIG. 18 illustrates the example in which the smartphone 1800 includes the multiple antennas 1816, the smartphone 1800 may also include a single antenna 1816.

Furthermore, the smartphone 1800 may include the antenna 1816 for each radio communication scheme. In that case, the antenna switches 1815 may be omitted from the configuration of the smartphone 1800.

The bus 1817 connects the processor 1801, the memory 1802, the storage device 1803, the external connection interface 1804, the camera 1806, the sensor 1807, the microphone 1808, the input device 1809, the display device 1810, the speaker 1811, the radio communication interface 1812 and the auxiliary controller 1819 to each other. The battery 1818 supplies power to blocks of the smartphone 1800 illustrated in FIG. 18 via feeder lines, which are partially shown as dashed lines in the figure. The auxiliary controller 1819 operates a minimum necessary function of the smartphone 1800, for example, in a sleep mode.

In the smartphone 1800 illustrated in FIG. 18, the interacting unit 804 described by using FIG. 8 may be implemented by the radio communication interface 1812. At least a part of the functions may also be implemented by the processor 1801 or the auxiliary controller 1819.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated devices. Alternatively, multiple functions implemented by multiple units in the above embodiments may be implemented by separated devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

The invention claimed is:

1. An electronic device in a wireless communication system, comprising:
    processing circuitry configured to
    measure a discovery reference signal of a target cell on an unlicensed frequency in a reference signal measurement timing configuration;
    perform Layer-3 filtering on a result of the measuring of the discovery reference signal prior to use of the result of the measuring in evaluation of reporting condition or measurement reporting; and
    perform mobility management of the electronic device based on a result of the Layer-3 filtering, wherein
    the Layer-3 filtering is expressed as $F=(1-\alpha)F_{n-1}+aM_n$, where
    $M_n$ indicates a measurement result from a physical layer,
    $F_{n-1}$ indicates a preceding measurement result after being subject to filtering, where $F_0$ is to $M_1$ when a first measurement is received,
    $\alpha$ indicates a predetermined filter operation, and
    adjust the $\alpha$ parameter to reduce an influence of the result of the measuring with a high interference.

2. The electronic device according to claim 1, wherein the processing circuitry is further configured for cell reselection when a user equipment is in an idle state and to report the result of the measuring of the discovery reference signal when the user equipment is in a connected state.

3. The electronic device according to claim 1, wherein a user equipment does not need to report the measurement result to a base station when performing a cell handover.

4. The electronic device according to claim 1, wherein the target cell is a macro cell or a small cell.

5. The electronic device according to claim 1, wherein the processing circuitry is further configured to generate a measurement report that contains statistical information on the result of the measuring of the discovery reference signal with high interference.

6. The electronic device according to claim 1, wherein the processing circuitry is further configured to evaluate whether to report the filtered result of the target cell based on the result of the measuring of the discovery reference signal with high interference to a base station.

* * * * *